(12) United States Patent
Tanner et al.

(10) Patent No.: US 11,843,784 B2
(45) Date of Patent: Dec. 12, 2023

(54) METHOD AND SYSTEM OF MULTIPLE CHANNEL VIDEO CODING WITH CROSS-CHANNEL REFERENCING

(71) Applicant: INTEL CORPORATION, Santa Clara, CA (US)

(72) Inventors: Jason Tanner, Folsom, CA (US); Vasily Aristarkhov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 930 days.

(21) Appl. No.: 16/582,975

(22) Filed: Sep. 25, 2019

(65) Prior Publication Data

US 2020/0021813 A1 Jan. 16, 2020

(51) Int. Cl.
*H04N 19/146* (2014.01)
*H04N 19/124* (2014.01)
*H04N 19/172* (2014.01)
*H04N 19/30* (2014.01)
*H04N 19/177* (2014.01)
*H04N 19/159* (2014.01)
*G06V 20/40* (2022.01)

(52) U.S. Cl.
CPC .......... *H04N 19/146* (2014.11); *G06V 20/48* (2022.01); *H04N 19/124* (2014.11); *H04N 19/159* (2014.11); *H04N 19/172* (2014.11); *H04N 19/177* (2014.11); *H04N 19/30* (2014.11)

(58) Field of Classification Search
CPC .... G06V 20/48; H04N 19/124; H04N 19/146; H04N 19/147; H04N 19/152; H04N 19/154; H04N 19/159; H04N 19/172; H04N 19/177; H04N 19/179; H04N 19/30
USPC ..................................................... 375/240.03
See application file for complete search history.

(56) References Cited

U.S. PATENT DOCUMENTS 9,615,098 B1 * 4/2017 Yi ........................... H04N 19/14
2020/0374536 A1 * 11/2020 Edpalm ................ H04N 19/436

* cited by examiner

*Primary Examiner* — Christopher S Kelley
*Assistant Examiner* — Ana Picon-Feliciano
(74) *Attorney, Agent, or Firm* — Essential Patents Group, LLP

(57) ABSTRACT

Techniques related to video coding include multiple channel video coding with cross-channel referencing.

24 Claims, 8 Drawing Sheets

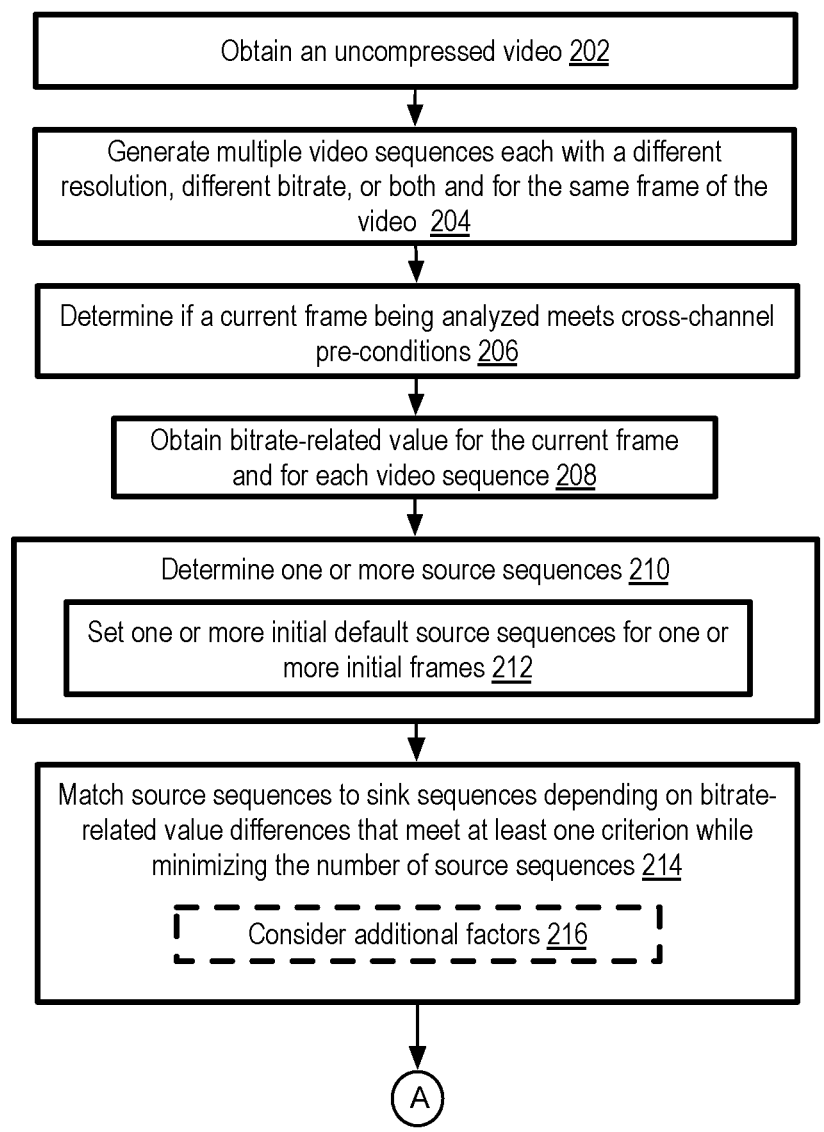

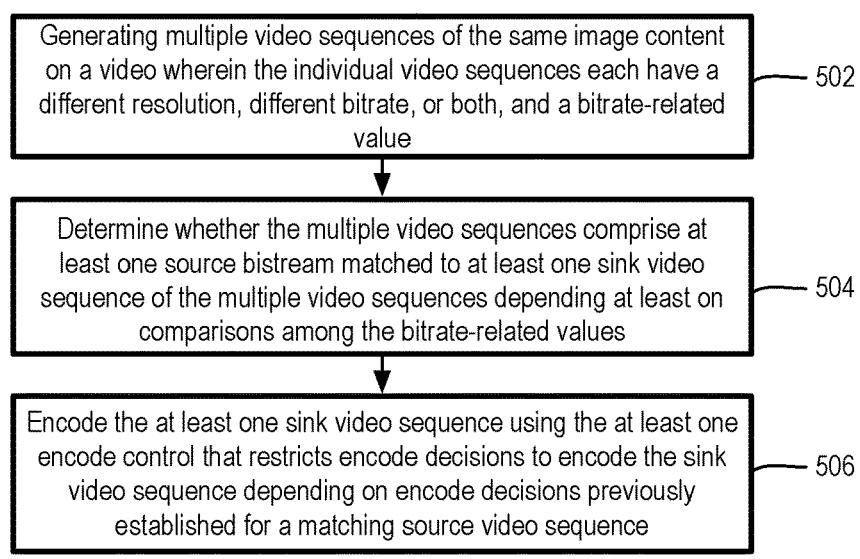
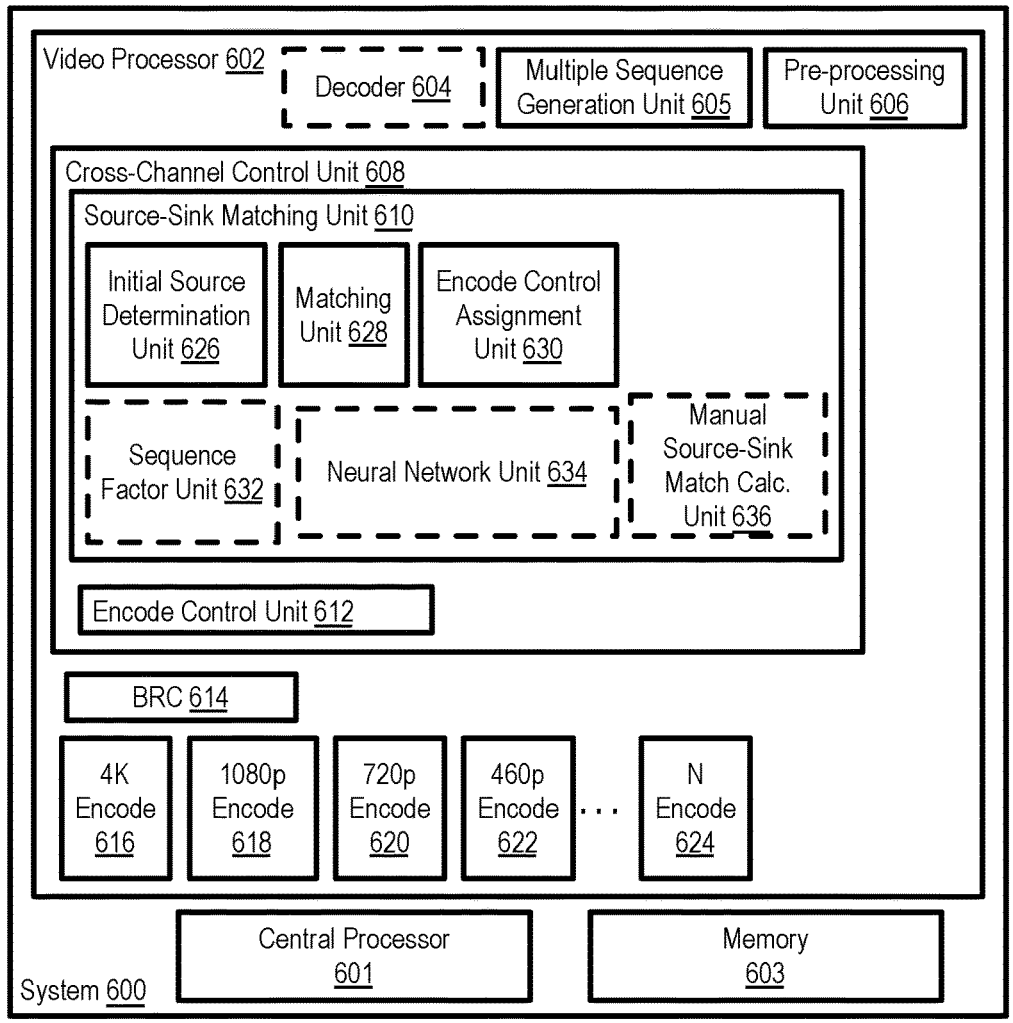

METHOD AND SYSTEM OF MULTIPLE CHANNEL VIDEO CODING WITH CROSS-CHANNEL REFERENCING

BACKGROUND

In video compression and/or decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

In some contexts, large batches of videos are encoded such that each video (e.g., each piece of content) is encoded in multiple resolutions, bitrates, frame rates, etc. For example, a streaming video service may encode a single video to have a 4K resolution with a frame rate of 60 fps, 1080p resolution with a frame rate of 60 fps, 1080p resolution with a frame rate of 30 fps, 720p resolution with a frame rate of 30 fps, 480p resolution with a frame rate of 30 fps, and so on with all of those resolutions encoded at, for example, 10 different bitrates. The streaming experience, however, can often be inadequate when performance and quality are not properly balanced due to large computational loads from device resolution, restricted bandwidths, and poor internet connection speed, especially in a dynamic setting that varies as a video sequence is being coded and subsequently displayed.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 2A-2B is a detailed example method of video coding with cross-channel referencing according to at least one of the implementations herein;

FIG. 5 is another method of video coding according to at least one of the implementations herein;

FIG. 6 is an example system for video coding;

DETAILED DESCRIPTION

Figure 1:
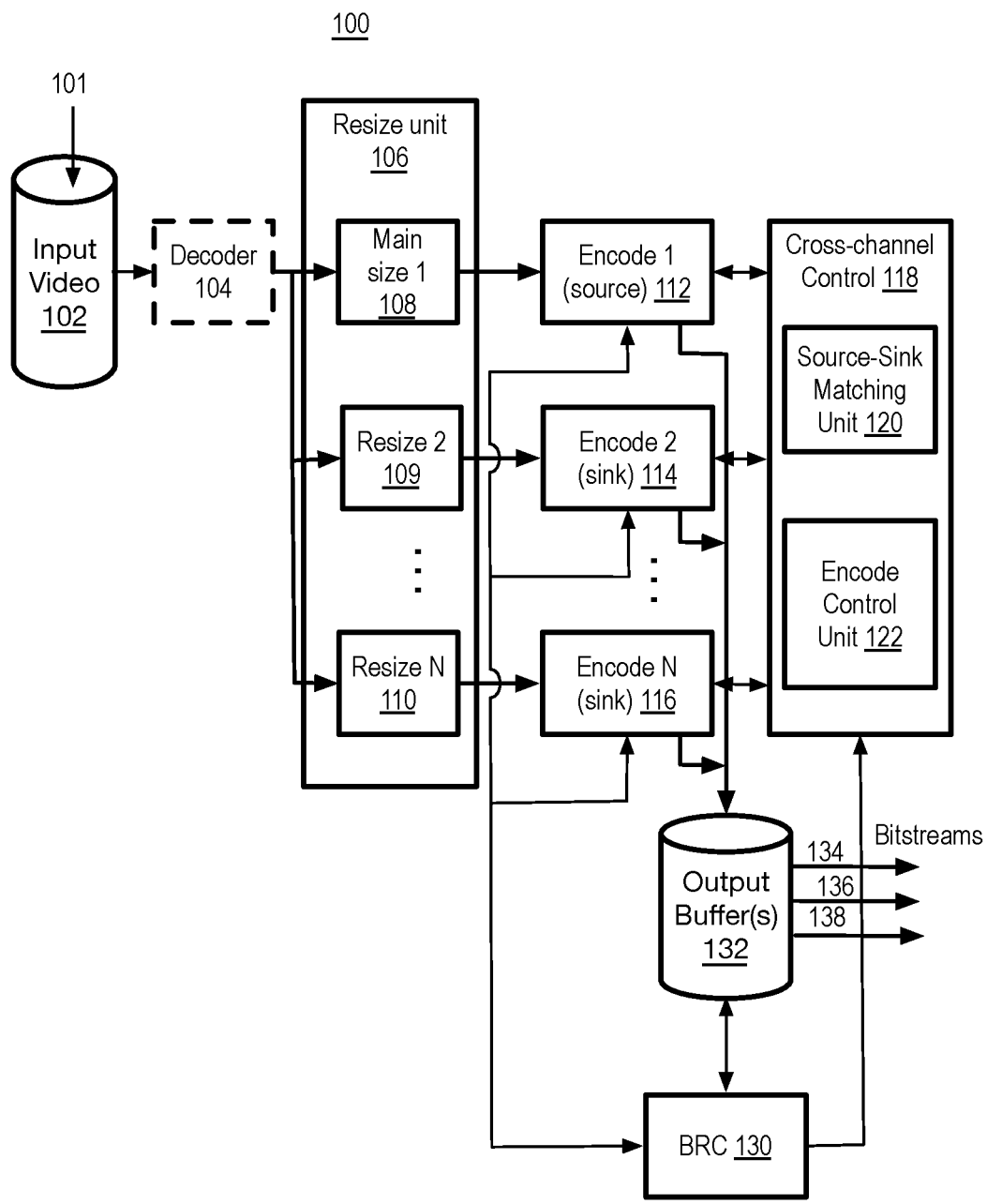
FIG. 1 is an illustrative diagram of an example system for coding a video to multiple independent bitstreams.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to video coding and, in particular, to multiple channel video coding with cross-channel referencing.

As described above, it may be advantageous to encode large batches of videos such that a particular video (e.g., a particular piece of video content) is encoded in multiple resolutions and bitrates as well as other parameters. For transcoding on a server for example, a system often encodes a video stream with multiple resolutions and at multiple bitrates for each resolution. By one example, certain media services operate in adaptive bit-rate (ABR) mode that requires storage of multiple instances (video sequences) of the same original video being transcoded on separate channels or encoders and from the original sequence provided by the content creator. For instance, a video streaming internet service may store multiple bitrates of a video at 4k and multiple bitrates of the same video of 1080p, plus it may even use different encoding options to generate output for the different resolutions. As the internet connection changes to adjust the bandwidth higher or lower, the service will switch from one bitrate and/or resolution to another bitrate and/or resolution to optimize the viewing experience for the end user.

Traditionally, however, each encode is handled independently on a separate channel with a separate encoder. This results in inefficient performance due to duplication of effort from individual video sequence to video sequence (or channel to channel). Specifically, encoding decisions on one video sequence (say the 4K sequence) may review 100 different ways to perform inter-prediction on a certain frame but narrows the choices down to three possible ways that are the most likely to provide a good quality image. Another channel, say a 1080p channel of the same frame, will need to separately make this same determination with the same or similar input image data of the frame. If one channel or encoder could provide data that indicates previously made decisions or parameter settings that can be used at another channel or encoder, this would significantly reduce the computational load to make these decisions on the latter channel, and in turn reduce the time to make these decisions thereby increasing performance.

Accordingly, it has been found that adjustments to the encoding that improve a balance between performance and quality can be established by creating dependencies between the video sequences of different resolutions and/or bitrates (or other parameter differences such as frame rate). By one cross-channel referencing system, this involves referencing encoding parameters of a video sequence with a certain resolution and bitrate to be used by an encode for a video sequence with a different resolution and/or bitrate (or other parameter). Such referencing at least significantly reduces the number of alternatives to analyze to form an encoding processing decision such as for inter or intra prediction for example, thereby reducing the time and computational load of such decisions. Such a system is disclosed by U.S. patent application Ser. No. 16/369,937, filed Mar. 29, 2019, and which is incorporated herein for all purposes.

In more detail, such a cross-channel referencing system optimizes 1:N transcoding whether N refers to resolutions or bitrates (or other parameter) to enhance performance. These performance gains result in about 30% to 50% performance improvement for the encoder portion of a transcode operation without significantly reducing quality for example. This is accomplished by transmitting the decisions and heuristics from one encode unit for one bitstream format to a second encode unit for another bitstream format to reduce the time spent making encoding decisions for the second encode unit and by focusing on the most likely candidates and other parameters already used on one of the other channels. This may be performed on a block-by-block basis or other processing partition unit. For example, such decisions and heuristics that form cross-channel encode controls to be provided for a video sequence (or channel or encoder) from a different video sequence (or channel or encoder) may relate to selection of a cross-channel block size considering a first input resolution to provide the cross-channel rules block by block (or on a block level), a coding prediction mode (e.g., inter, intra, skip, merge), a motion vector, an intra mode, a coding unit partitioning of the cross-channel block (i.e., defining the coding unit sizes and shapes within the cross-channel block), and/or transform unit depth or partitioning of the cross-channel block (i.e., defining the sizes and shapes of transform units for the cross-channel block), and so forth.

The encode controls are formed by translating coding parameters at the first resolution and the first bitrate from the first encode to be used to encode the video at a second resolution or a second bitrate. As used herein, the term encode controls includes any data structure or indicators that restrict encode decisions by setting the encode decision (such that the decision is not evaluated at the encode but is simply used) or by setting a restriction that limits evaluation of options at the encode. Likewise, the term restriction to encode decisions indicates the encode will be defined by the restriction (e.g., the restriction is used directly) or the encode will be modified by the restriction (e.g., the restriction is used to limit the number of encode options to be evaluated, searched, etc.). For example, such limits on evaluation may restrict block evaluation to only intra modes (while inter modes are not checked), to only inter modes (while intra modes are not checked), to only particular types of intra modes, to motion search only within a confined region around a motion vector or to only fractional motion vector search around an integer motion vector, to only evaluating particular partitions of a block (such as block sizes) for coding mode evaluation, to only evaluating particular transform unit split depths (e.g., only particular partitions of coding units for best transform unit size), and so on. Such encode controls may be generated from a first processing partition (such as a block) in the first encode and translated for use by a second partition in the second encode that corresponds to the first partition. As used herein the term corresponding with respect to blocks, for example, indicates the blocks are fully or partially spatially collocated in their respective frames (scaled as needed when the video size has been scaled) and temporally collocated in their respective videos.

The cross-channel referencing system mentioned above assumes the quantization parameter (QP) is the same or similar from channel to channel. In known video coding standards, the encoder generates residuals that are a difference between original and prediction image data for the same area on an image such as a block of pixels. The residuals are transformed into coefficients by a discrete cosine transform algorithm or other such transform algorithms. These coefficients are then quantized into a discrete set of values (or quantization steps) similar to a rounding operation thereby causing lossy compression of the residuals. The QP is used to form a Qstep value that usually indicates the number of discrete steps, and in turn the size of the step, to use. So, in very general simplified example terms, one could state a transformed residual r×1/(Qstep (QP)) generates the quantized value. The larger the QP, the larger the Qstep. Since that forms the denominator in the equation, the larger the step the less detail and accuracy is preserved although computational load decreases. The smaller the QP, however, the smaller the step, and more detail with more computational load is obtained.

The QP is set depending on the desired bitrate, and is often set on a frame-by-frame basis. Each frame may have a different QP. Specifically, QP can vary within a frame and often does, but even when QP is varied, the frame is encoded with a target QP which will be roughly the average QP value for the frame. Here for multiple bitstreams, however, each video sequence or each encoder forming an independent bitstream also may have a different QP for the same frame. For example, some encodes may use the same bitrate for different resolutions (e.g., 4K at 20 Mbps and 1080p at 20 Mbps). As content is downscaled, it loses detail as well. So, one stream may use a lower or higher QP than the same scaled content in another stream in order to maintain the similar bitrate in this case.

In the cross-channel system mentioned above, a default video sequence and encoder are selected as a first or initial video sequence with a default resolution and bitrate for example. All of the video sequences with different resolutions and/or bitrates may receive the encode controls that translate the coding parameters of the first video sequence to be compatible with the resolution and bitrate of the receiving video sequence. When a large difference in QP exists from video sequence to video sequence, the described cross-channel system may use the QP to determine exactly which and how to adjust certain encoding parameters. For example, in some cases when there is a large difference in QP between the default video sequence and a receiving video sequence, the translated motion vectors may be scaled differently. Some other altered translation techniques may include using block size constraints to only check the 4K projected block size and smaller block sizes when the QP is lower than at the initial encode, and so forth.

However, the cross-channel system described typically does not decide which video sequences should receive the encode controls in the first place, and the QP is not a consideration at this point. Since the described cross-channel system does not determine how to match an initial encode with receiving encodes to provide the encode controls, at least by factoring the QP, this leaves the described cross-channel system susceptible to providing bitstreams with low quality. This can occur because without considering the QP to match a source video sequence to a receiving or sink video sequence, changes in rate control at different resolutions that affect quality are not adequately considered. This can result in drops of quality such as noticeable artifacts and lack of clarity in the images.

Another problem is that different encoder units for different bitstreams may use very different options like frame type or a reference list to produce output. In these cases, as the difference in QP between the initial video sequence and a receiving video sequence widens, the quality impact increases even more significantly such that the coding parameters of the initial video sequence become less and less relevant to the receiving video sequence. At some point when the difference in QP is large enough, the encode controls become irrelevant and even detrimental to the encoding at the receiving video stream.

To resolve these issues, a multiple channel video coding system and method with cross-channel referencing includes matching one or more source video sequences (or just source sequences or sources) to one or more receiving or sink video sequences (or just sink sequences or sinks) depending on a bitrate-related value of each of the video sequences. By one form, a source video sequence is matched to a sink video sequence to provide encode controls to the sink video sequence when the difference of the bitrate-related values is less than a threshold. By one form, the bitrate related value is either the QP or Qstep based on the QP. Another rule is that the number of source video sequences is to be minimized since sources take longer to encode with a larger computational load due to the larger number of alternatives needed to be checked for encoding decisions versus that performed by the sinks that use the encode controls. Thus, a group of video sequences that are all within a certain QP range of each other may use a single source video sequence. Other factors may be used as well such as the frame to frame QP history, the relativity of the QP values to each other (which is higher), a quality factor, a performance factor, and/or a target quality-performance balance factor. By one approach, machine learning such as a neural network is used to determine which video sequences are sources, which are sinks, which source-sink matches to use, and by considering either the bitrate related-value differences with the minimization rule alone, or with one or more of the additional factors mentioned.

By one form, the disclosed system compares the bitrate related values and other factor values between each potential pairs of all sequences, and the system decides which one or more sequences are to be sources, and which one or more sequences are to be the sinks, and for which source sequence. One source sequence may have one or more sink sequences, and there may be more than one source sequence. By one form, this is determined on a frame by frame basis, and which sequences are source sequences, and which are their sink sequences, may change from frame to frame. Thus, while each video sequence may extend along multiple frames (a global video sequence of frames), video sequences referred to herein may more precisely refer to a section or portion of a global video sequence (a local video sequence) that provides the pixel image data of just a single frame, but is still referred to herein simply as a video sequence for brevity. Whether a global video sequence of multiple video frames or a video sequence forming a single frame is being referred to should be clear from the context herein. When a source sequence is matched to a sink sequence, then encode controls can be generated by using the coding parameters of the source sequence, and the encode controls can be provided to the sink sequence for encoding of the sink sequence.

With this arrangement, the balance between performance and quality is improved significantly when video coding produces multiple bitstreams such that drops in quality or performance are not noticeable. Specifically, if the content, due to complexity or resource limitation, is behind performance deadlines, normally the only option would be to reduce the target usage (TU) to improve performance which is usually a significant quality tradeoff. But in this case, more sinks can be created instead of sources by tolerating a wider QP delta giving each sink the ~50% performance improvement thus allowing the encoder to reach performance targets. Also, the different coding parameters such as limiting motion vector search, limiting intra and/or inter modes, limiting CU sizes, and so forth, can all be employed with their respective quality performance tradeoffs. For instance, removing intra modes for many CUs can remove 90% of the intra calls with a 0.1% compression impact. Removing available CU sizes can cut the performance by 50% while impacting compression by 1%.

Referring now to FIG. 1, an example system 100 for coding a video to multiple independent bitstreams is arranged in accordance with at least some implementations of the present disclosure. The system 100 may be a transcoding device at a server or other computing device that can receive and transmit compressed videos 101. By the approach here, an input video buffer 102 may receive a compressed video 101. When the system 100 is a transcoder, a decoder 104 is provided and then decompresses the video 101 to provide a decompressed video for encoding by encoders 1 to N (112, 114, 116). The encoders 112, 114, 116 generate compressed video sequences that are packed into bitstreams 134, 136, and 138 for transmission to other computing and/or display devices. The bitstreams 134, 136, and 138 here may be determined frame by frame. By other forms, system 100 is only an encoding device that receives decompressed data from a remote decoder 104 or from a different device such as a camera generating image data and providing the data directly to system 100. Thus, system 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

The system 100 may receive video in many different resolutions such as 4K video 101 (or video at any suitable resolution). Video 101 may include any video sequence for encode. Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), or 4K resolution video, or the like, and the video may include any number of video frames, sequences of video frames, pictures, groups of pictures, or the like. The encoding techniques used herein may be performed by using frames, blocks, and sub-blocks, and so forth of pixel samples (typically square or rectangular) in any suitable color space such as YUV. Frames may be characterized as pictures, images, video pictures, sequences of pictures, video sequences, etc. For example, a picture or frame of color video data may include a luminance plane or component and two chrominance planes or components at the same or different resolutions with respect to the luminance plane. The video may include pictures or frames that may be divided into blocks of any size, which contain data corresponding to blocks of pixels. Such blocks may include data from one or more planes or color channels of pixel data.

A non-compressed version of the input video 101 is provided from the decoder 104, when provided, and to a resizing unit 106 that generates multiple video sequences (or units) each to form an independent bitstream. The resizing unit 106 may include a downsampler for downsizing image data and performs scaling techniques to change the resolution of a main or default video sequence with one resolution (main size 1), say 4K, and generates video sequences (resize 2) 109 to video sequence N (resize N) 110, which may be any resolutions such as 1080p, 720p, 480p, and so forth. The resizing unit also may have an upsampling unit for upscaling the image data as well.

An encoder is provided for at least each different resolution, such as for the example here, a 4K encoder unit (or encode 1 unit) 112, a 1080p encoder unit (or encode unit 2) 114, and any other number of encoders to encode unit N 116 which may be a 720p encoder or module 116. These are random examples and any suitable resolutions may be used. Furthermore, encode units for the encode of differing bitrates, frame rates, etc. also may be employed. Each of 4K encode unit 112, 1080p encode unit 114, and 720p encode unit 116 are illustrated separately for the sake of clarity. However, such modules or units may be implemented in the same or different encode software, hardware, firmware, etc. Notably, the encodes performed by 1080p encode unit 114 and 720p encode unit 116 may be performed at least partially simultaneously using different units or multiplexed and context switched on the same hardware, or they may be performed serially using the same or different modules.

Encoders 112, 114, and 116 and their corresponding output bitstreams 134, 136, 138 may be compatible with a video compression-decompression (codec) standard such as, for example, HEVC (High Efficiency Video Coding/H.265/MPEG-H Part 2), although the disclosed techniques may be implemented with respect to any codec such as AVC (Advanced Video Coding/H.264/MPEG-4 Part 10), VVC (Versatile Video Coding/MPEG-I Part 3), VP8, VP9, Alliance for Open Media (AOMedia) Video 1 (AV1), the VP8NP9/AV1 family of codecs, and so forth.

A bitrate control (BRC) unit 130 is provided to set the QP so that the encoding meets the bitrate set by other transmission applications and for the output bitstreams generated at each encoder 112, 114, 116. Here, the BRC 130 may be formed of shared hardware and/or software to control the encode units 112, 114, 116, but it will be understood that each encode unit 112, 114, 116 may have its own BRC unit 130. The BRC 130 monitors an output buffer 132 that is either partitioned to provide an output buffer for each encode unit 112, 114, 116, or a separate output buffer 132 may be provided for each encode unit 112, 114, 116. The BRC raises or lowers the QP for a frame of the video sequence depending on the varying capacity of the output buffer 130 for the encoder and as new frames are stored in, and retrieved from, the output buffer so that the output buffer can meet the target bitrate requirements.

Thus, when it is stated a 4K video sequence is provided in 10 different bitrates when a different encoder may be used to provide each of those 10 bitrates, each video sequence will set the QP independently on a frame to frame basis to meet their respective target bitrate settings. As to the system 100, the encoders 112, 114, and 116 then proceed to compress the incoming video sequences, each at least at a different resolution or other parameter as noted above. Additional separate encoder units can be provided each to encode at a different bitrate where a number of the encode units compress the same resolutions for example. Otherwise, during encode of frames of video 101, the encode unit receives the QP from the BRC in order to maintain a certain desired target bitrate, and the QP may change from frame to frame.

Also, each of the encoders 112, 114, 116 may have other units to perform the encoding that need not be described in detail here such as units that determine any number of coding modes (including intra or inter prediction), coding unit partitions, transform unit partitions, and so on that are evaluated to arrive at final coding modes for video 101. These operations may involve an encode controller, a transform module, a quantization module, an intra prediction module, an inter prediction module, a reference picture buffer, a scanning module, an entropy encoder, and so forth. Such modules are known to those of skill in the art and are not discussed further herein with respect to FIG. 1 for the sake of clarity in presentation. In an implementation, coding parameters are determined for the encoding of source sequences and indicate encode decisions used to encode the video sequence. This may be performed on a block by block basis.

The system 100 also has a cross-channel control 118 with a source-sink matching unit 120 and an encode control unit 122. The source-sink matching unit 120 determines the differences in bitrate-related values of each video sequence of the same frame, and determines which video streams should be source sequences and which video streams should be sink sequences while attempting to minimize the number of source sequences. This may be performed by factoring in the bitrate-related value differences among all possible video sequence pairs, while minimizing the number of source sequences to reduce the computational load at the sources since encoding decision alternatives are not eliminated at the source sequences. Other factors may be considered as well such as the QP frame-level history of a video sequence, the relative value of the QPs (which of the pair of sequences has the high or lower QP), as well as a quality rating value, a performance rating value of the sequences, and a target balance rating. Any combination of these could be used in addition to using the QP differences and minimization rule. By one approach, the source-sink matching unit 120 has a neural network to perform the matching as described below.

Once the source sequences and their sink sequences are identified and matched by the source-sink matching unit 120, an encode control unit will translate the coding parameters of the source sequences to be used to reduce the decision alternatives at their sink sequences. The details of these operations are provided by U.S. patent application Ser. No. 16/369,937 cited above, which is incorporated herein and need not be explained in detail here. Generally, the translation operations may include first providing coding parameters, which may be provided at a block level, from a source encode unit. This may be main encode unit 112. The encode control unit 122 then uses the coding parameters to generate one or more encode controls for differing resolutions, bitrates, frame rates, etc. Coding control may be translated, including scaling, from one resolution to that compatible with another resolution in many different combinations of resolutions. By one form, the encode control unit 122 may create a surface (i.e., one of block level coding controls) at a per CU level in a new resolution with encode controls for the encoding enhancement of the lower resolution encode. Such enhancements improve the performance and quality balance of the encode at lower resolutions. In addition to the performance improvements, the visual quality can also be enhanced through more accurately capturing the true motion and/or characteristics of the video.

The encode controls are then used to encode the same video at a sink or second resolution or a sink or second bitrate to generate a second bitstream by encode unit 114 or 116 for example. Notably, the sink bitstream is independent of the initial or first bitstream of encode unit 112 such that the entirety of the sink bitstream is sufficient to decode the video at the sink resolution and sink bitrate. That is, the sink bitstream does not need to rely in any way on the source bitstream for decode of the video to generate a bitstream. However, the encode controls received from another video sequence helps to improve performance and/or quality of the sink bitstream. Furthermore, as discussed, the source and sink bitstreams represent the same video content such that the same video (at different resolutions and/or bitrates) may be independently decoded using the source and sink bitstreams.

The output bitstreams 134, 136, 138 respectively generated by encode units 112, 114, 116, each may be any bitstream representative of video 101 such as an HEVC compliant bitstream. System 100 may generate any number N of bitstreams having various resolutions, bitrates, frame rates, etc. such as dozens or even over 100 bitstreams. Such bitstreams may be subsequently transmitted, optionally dynamically, to decode devices for consumption by users. Bitstreams 134, 136, 138 as generated by encode units 112, 114, 116 using encode controls to improve bitstreams from encode units 114, 116 may be stored to memory such as the output buffer(s) 132, transmitted to another device, and so on for eventual decode and presentment of the decoded video to a user or users.

Figure 2B:
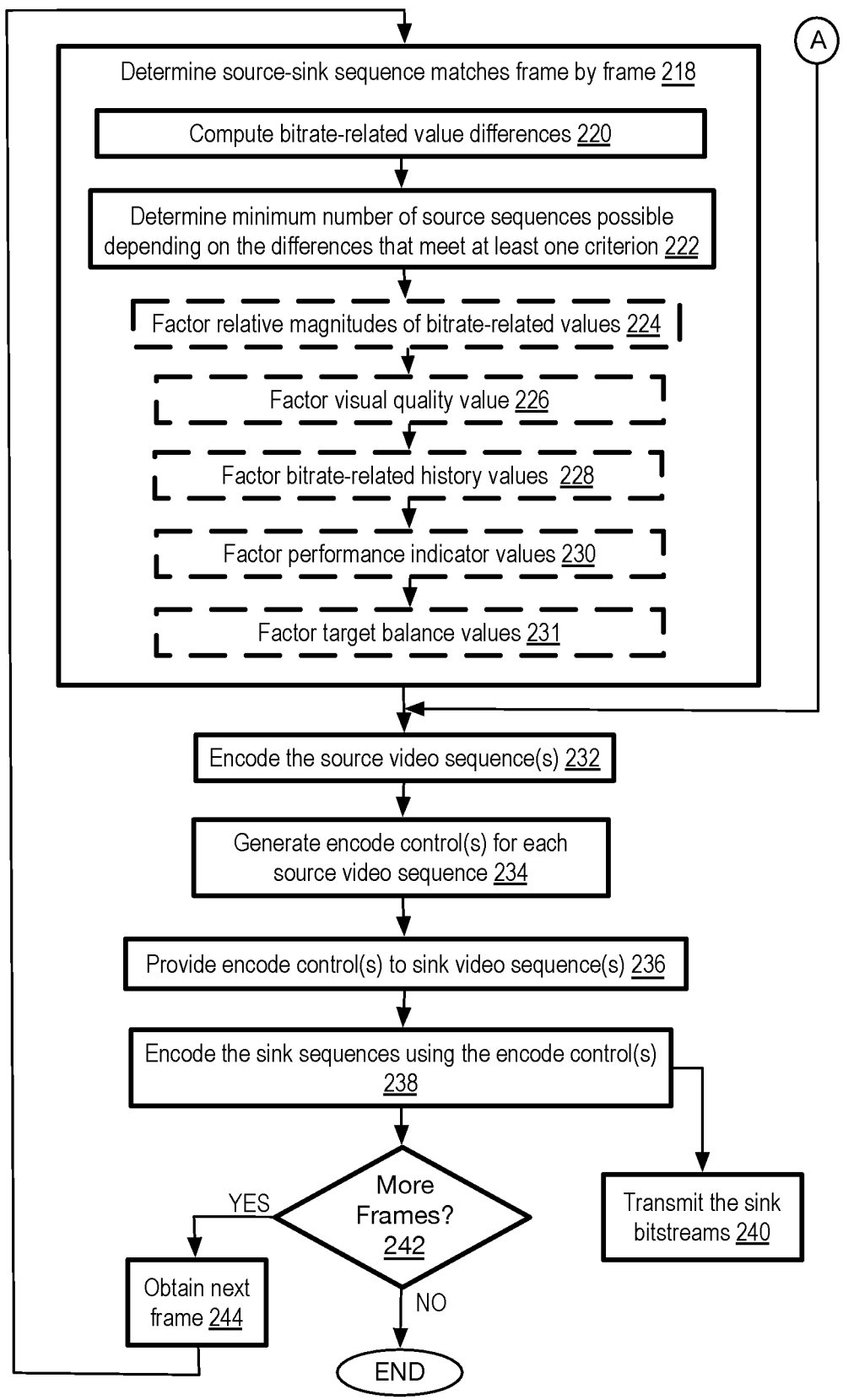

Referring to FIGS. 2A-2B, an example process 200 for video coding is arranged in accordance with at least some implementations of the present disclosure. Process 200 may include one or more operations 202-244 generally numbered evenly. Process 200 may form at least part of a video coding process. By way of non-limiting example, process 200 may perform a coding process as performed by any device or system as discussed herein such as system 100 (FIG. 1) and/or video processor system or device 600 (FIG. 6). Furthermore, process 200 may be described herein with reference to any of the systems 100 and/or 600.

Process 200 may include "obtain an uncompressed video" 202, and as mentioned above, may be obtained after decoding at a transcoding server for example, or may be for encoding of stored or received raw or streaming video on any computing device with coder capabilities as mentioned herein, such as a smart phone, digital camera, or other computing device. The video may include luminance and chroma data pre-processed sufficiently for encoding, but is otherwise as described above with system 100.

Process 200 may include "generate multiple video sequences each with a different resolution, different bitrate, or both and the same frame of the video" 204. This may involve generating multiple video sequences that include sequences of pixel data forming video frames, and here, a video sequence that forms a single frame's worth of image data. This may involve resizing or downsampling, where by one example form, the uncompressed video may be provided in a 4K resolution video, and video sequences of 1080p, 780p, and 480p may be formed by downsizing the 4K video sequence. This also may involve encoding each of the different resolution video sequences at different bitrates thereby encoding video sequences at 10 different bitrates each for example. It also should be noted that the video sequences could be provided in different frame rates as well. However, the cross-channel methods herein do not necessarily differentiate treatment for different frame rates.

Process 200 may include "determine if a current frame being analyzed meets cross-channel pre-conditions" 206. This is referred to as aligning encoder parameters because if the multiple encode units are not using sufficiently similar frame-level parameters, then the cross-channel referencing may not work adequately to meet performance demands. This may include determining whether or not a scene change is occurring, or a scene is just starting where image data statistics may be too varied and bitrate-related values (such as QPs) also vary too widely. This also may include determining the GOP picture type of a frame where frame types should only be matched with video sequences of other frame types such that if no matching frame types exist, then cross-channel referencing may be omitted all together. Another precondition may be whether frame dropping is too prevalent such that the cross-channel referencing becomes too unpredictable when it is used inconsistently along the video on too few frames. Other preconditions may be used as well. To omit the cross-channel operations at a particular frame, the system 100 may mark a particular frame to be a source frame.

Process 200 may include "obtain bitrate-related value for the current frame and for each video sequence" 208, where the bitrate related value is the QP itself or a Qstep value. As mentioned, the BRC monitors the varying capacity of output buffers of each encoder and used to pack the bitstreams before transmitting the bitstreams. The BRC varies the QP in order to fill the buffers without over or under flowing the buffers. The BRC sets the QP depending on the target bitrate.

Process 200 then may include "determine one or more source sequences" 210, and this may first include "set one or more initial default source sequences for one or more initial frames" 212. Thus, at the beginning frames of a global video sequence, one of the video sequences at a certain resolution, such as 4K, and certain bitrate, such as 20 Mbps, may be set as a single source video sequence for a first frame of the sequence, or a certain number of initial frames. By an alternative when multiple bitrates are provided for a single resolution, each of the video sequences with that resolution may be set as initial source video sequences. Thus, if ten video sequences have a 4K resolution each with a different bitrate, each of those ten 4K video sequences may be an initial source video sequence. The initial source video sequence usually may be the same resolution as the resolution of a single non-compressed input video being encoded, but need not always be. The resolution of the initial source video sequence may be selected based on the resolutions being encoded. So, if the maximum resolution being encoded is 4k, 1080p can predict accurately to both 4k and 720p which is a large impact on the overall performance. Predicting from 480p to 4k would not be very useful. If the maximum resolution is 8k, then 4k is a good target resolution to speed up the 8k video source.

Otherwise, by one example form, the default initial source video sequence(s) may be selected depending on spatial complexity of the frame so that an intermediate bitrate can be used as source for more sinks or selected by bitrate target for similar reasons.

Process 200 may include "match source sequences to sink sequences depending on bitrate-related value differences that meet at least one criterion while minimizing the number of source sequences" 214. This may involve determining whether each possible source-sink pair has a difference in bitrate-related values, such as the QPs, that is less than a threshold, which by one example is 10 when a typical QP range is 0 to 52. With pairs that meet this criterion, then the number of source video sequences are minimized. Thus, when two video sequences both have QPs within the threshold range of a third video sequence but are not within range of each other, that third video sequence should be the only source sequence. Additional factors may be considered as well 216 that modifies these difference and minimization considerations, or provides additional considerations. This is described in greater detail below for the same matching operations for the later frames in operation 218 of process 200.

To first complete the analysis of the first or initial frames, process 200 continues with operations to encode the source video sequences 232, and once encoded, encode controls may be formed 234 for each source video sequence, where the encode controls are as described above. The encode controls are then respectively provided 236 to the matched sink video sequences, and the sink video sequences are encoded 238 using the encode controls. The process 200 then packs the encoded video streams into bitstreams and transmits 240 them. More details are provided below with the operations with the later frames.

Any time after source and sink matches are determined for a frame, and those decisions are being used for encoding operations, the process 200 may continue with an inquiry 242 to determine if there are more frames in the global video sequence. If not, the process ends. If so, process 200 obtains the image data and parameters of the next frame including the bitrate-related value (or QP) of each video sequence in the frame, and proceeds to "determine source-sink matches frame by frame" 218. The details are as follows.

Process 200 may include "compute bitrate-related value differences" 220, where the bitrate-related values of all of the video sequences in a frame are differenced from each other such that any video sequence can be a source or a sink. By another alternative, the system may limit the matching to only certain video sequences (certain resolutions, certain bitrates, or other parameters of the video sequences).

Process 200 may include "determine minimum number of source sequences possible depending on the differences that meet at least one criterion" 222. Here, the differences in bitrate-related value are compared to a threshold, such as about 10 when the bitrate-related value is QP. It has been determined that video sequences with QPs greater than about 10 when the QP range is 0 to 52 have such significant differences in the level of image detail that the encode controls from one to the other video sequence are not usable. The detail in the encode controls either will be missing too much detail or will be provided in a precision so small it will limit the compression efficiency to apply to an image with drastically reduced or downscaled image content. The threshold may be set by experimentation.

Also as mentioned, the number of source video sequences should be minimized. Thus, even though video sequences could all be paired 1:1, this has been found to be inefficient since source video sequences cannot use the encoding decision short cuts as at the sinks and will therefore take more computational load and more time to encode. Thus, when multiple video sequences all have differences within the matching threshold, the video sequence with the most possible sinks should be kept as a source video sequence, and other potential source video sequences should be changed to sink video sequences when possible. By one form, this could be accomplished by finding the video sequence that is in the most pairs that pass the threshold test. Thus, say video sequences A-E match sequences 1-5 forming pairs A1, B2, C3, D4, and E5. However, say sequence A is also matched with: AB, AC, A2, A3, and therefore, A should be set as the source for video sequences B, C, and 1-3. By one form, the source sequence may be set that is nearest a mean, median, or mode of the QPs. Many other variations are possible. Note that it does not matter what the resolution and target bitrate values are that define the different video sequences at least at this point when performing the bitrate-related value matching and minimization of source sequences.

As noted above in operation 216, additional factors may be used to determine whether a match between sink and source exists. Thus, process 200 may include "factor relative magnitudes of bitrate-related values" 224. It has been found that performance is better when the source video sequence has a higher QP than the QP of the sink video sequence. The video sequence with a higher QP is selected as the source in this case because it is more accurate to translate coding parameters from a video sequence with greater detail to less detail rather than translating from lower detail to greater detail by interpolation and other similar heavy computational load techniques. Thus, once source and sink video sequences are preliminarily matched by the QP, then this consideration may be used to determine which will be the source and which will be the sink. By another example, when there are multiple source video sequences, a sink sequence may be matched with a source sequence with a higher QP than the sink rather than being matched to a source sequence with a lower QP than the sink. Alternatively, the opposite could be used as well where the lower QP is the source video sequence. A lower QP could be selected as the source, however, when the minimization rule is the priority and this reduces the number of sources, while the QPs are still within the threshold.

As another factor, process 200 may include "factor bitrate-related history values" 228. In this case, instead of, or in addition to, the comparison of QPs on a current frame being analyzed, a comparison is also made between QPs of prior frames, or an average or other combination of QP (or bitrate-related) values are compared in addition to the comparison of QPs on the current frame. The average or combination value could be over a certain number of frames, such as least two, five, 10, or 50 frames to name a few examples, or could be based on the sequence content such as within a scene, or maintained within a group of pictures (GOPs) for example. This factor may be included to reduce the influence of any single outlier QP by better ensuring similar quality references among the streams thereby using the QP as a proxy for quality. By one example, when both comparisons pass a threshold (of current and prior frames), whether the same or different threshold is used, then the source and sink sequences are matched. Thus, a comparison of bitrate-related values of prior frames may comprise either comparisons using individual bitrate related values of certain one or more single prior frames or comparisons using a combination value computed by using a plurality of bitrate-related values of multiple prior frames, or both. The threshold for comparing bitrate-related values of prior frames, or values based thereon, may be determined by experimentation.

Process 200 may include "factor visual quality value" 226. Here, a rule may be used that video sequences should not be matched when the video sequences have coding parameters that provide for different frame types in the hierarchy level of a group-of-pictures (GOPs). Thus, a non-reference B-type video sequence should only be matched, in this case, with other non-reference B-type video sequences. This is the same with reference B-types, P-types, I-types, and so forth. This may be implemented here by providing a code or digit for each frame type, and matching only with video sequences with the same frame type code. This also may be used in the preconditions operation 206 to determine whether the cross-channel referencing should be used at all as mentioned above.

Process 200 may include "factor performance indicator values" 230. Here, the complexity of the image content is considered by determining whether target real time framerates are being met, such as 60 fps for example where 16 ms is available per frame to encode. This operation looks at frame encode times and adjusts computational loads to better meet target frame encode times. Thus, if the last frame was encoded in 17 ms, which is too long, then performance becomes a higher priority and quality may be lowered. In this case, more sink or lone video sequences without a match may be permitted to reduce the number of source video sequences. In this case, there may be a value to subtract from the number of source video sequences determined by strictly following the minimization rule to determine a permitted number of source sequences.

Process 200 may include "factor target balance values" 231. Here, a performance-quality balance value is set that is along a range of balance setting values, for a random example, say 1 to 10, where 1 is the fastest with least amount of detail or quality and 10 is the slowest with the most amount of detail or quality. This value may be used to set a number of different encoder parameter settings, and there may be a predetermined set of parameter settings for each value on the range. Here too, the number of sink and source video sequences may be determined depending on the balance value and a certain permissible number of sources or sink assignments may be set for each number in the range.

Thus, either the QP comparisons (or differences) with the minimization alone may set the source-sink matches, or any combination of these additional factors may be used to set or revise the number of possible source video sequences and sink video sequences as that set by the comparisons and minimization.

As mentioned, the cross-channel referencing is determined on a frame by frame basis, so that any source-sink pairs could be established anew on a subsequent frame. Thus, by one form, there is no frame to frame continuity for maintaining source-sink pairs. However, in an alternative form, when the bitrate is relatively stable (not too over run and not too under run), in this case, pairing or matches could be maintained and continue from frame to frame until the conditions of the bitrate changes.

Once the source-sink matches are established, process 200 may include "encode the source video sequence(s)" 232, and the source video sequences are encoded as mentioned above by known coding standards such as HEVC, and so forth. The result is compressed image data of the source video sequence as well as the coding parameters used to encode the source video sequence. The coding parameters may include block and other partition size and placement selections for a number of different encoding stages such as prediction and transform as well as encoder control unit size, inter-prediction selections, intra-prediction selections, prediction mode alternatives, and so forth as mentioned above.

Process 200 may include "generate encode control(s) for each source bitstream" 234. The coding parameters are then translated into encode controls that can be used by the matching sink video sequences. The details of such translating is provided by U.S. patent application Ser. No. 16/369, 937 cited above. By one example, the block based coding parameters are translated to block based encode controls for encode of the video at a second resolution or a second bitrate such that the encode controls include restrictions to encode decisions at a block level at the first or second resolution. The encode controls may be any controls discussed herein such as restrictions to check only inter modes and eliminate checks of intra modes for one or more blocks, restrictions to check only intra modes and eliminate checks of inter modes for one or more blocks, restriction to check only a limited size of coding units for one or more blocks, a restriction to check only a limited size of transform units for one or more blocks, or any other restrictions or controls discussed herein. In an implementation, translating includes scaling motion vectors. In an implementation, translating coding parameters to encode controls includes setting, when a prediction mode decision for a number of overlapping blocks is an intra mode, a restriction for the first block to only check intra modes or setting, when the prediction mode decisions for overlapping blocks are a mix of intra and inter modes, no mode check restriction for the first block. In some implementations, translating considers coding unit or block sizes at the source sequence frame to limit a coding unit partition size check. In an implementation, translating considers whether the source has a zero or non-zero transform unit split depth to limit block based coding parameters to either a zero or non-zero transform split depth of blocks on the source sequence frame or limit a transform unit split depth check. In some implementations, translating limits motion estimation searches to near motion vector locations from the source sequence. In an implementation, translating may consider whether the source or sink frame is a reference frame or a non-reference frame for inter prediction.

Process 200 may include "provide encode control(s) to sink bitstream" 236, where the generated encode controls are accessed by the encoder unit of the sink video sequence to set the coding parameters for that sink video sequence.

Process 200 may include "encode the sink sequences using the encode control(s)" 238. This at least reduces the number of alternatives for certain encoder decisions (such as whether to check intra options for prediction) and/or reduces a matching search space such as for inter-prediction motion estimation searches on reference frames. The encoder control could also set a specific alternative choice and eliminate the decision making altogether. The details for such application of encode controls also is provide by the U.S. patent application Ser. No. 16/369,937 cited above.

Process 200 may include "transmit the sink bitstreams" 240, where the encoded data is then packed into the bitstreams and stored or transmitted. An example bitstream, arranged in accordance with at least some implementations of the present disclosure, may correspond to any of bitstreams 134, 136, 138 of FIG. 1 for example, and, as discussed, the bitstreams are each independent in that no reference to or data from another bitstream is needed to generate decoded video therefrom. Such bitstreams may include a header portion and a data portion. The header portion may include mode decision indicators such as block or coding unit level mode decision indicators. The mode decision indicators may include mode decisions and partitionings of blocks of video. Furthermore, the data portion may include block data, which may include motion vectors, residual pixel values, etc. In some implementations, the bitstreams are standard compliant bitstreams. Notably, the bitstreams may be transmitted, stored, etc. for eventual decoding by a decoder.

As mentioned, the process repeats and may include the inquiry "more frames?" 242 to obtain data of the next frame 244 including the data of the multiple video sequences and bitrate-related value of each sequence, and loop back to operation 218 to match sources to sinks in the next frame. The process continues until the last frame is reached.

Figure 3A:
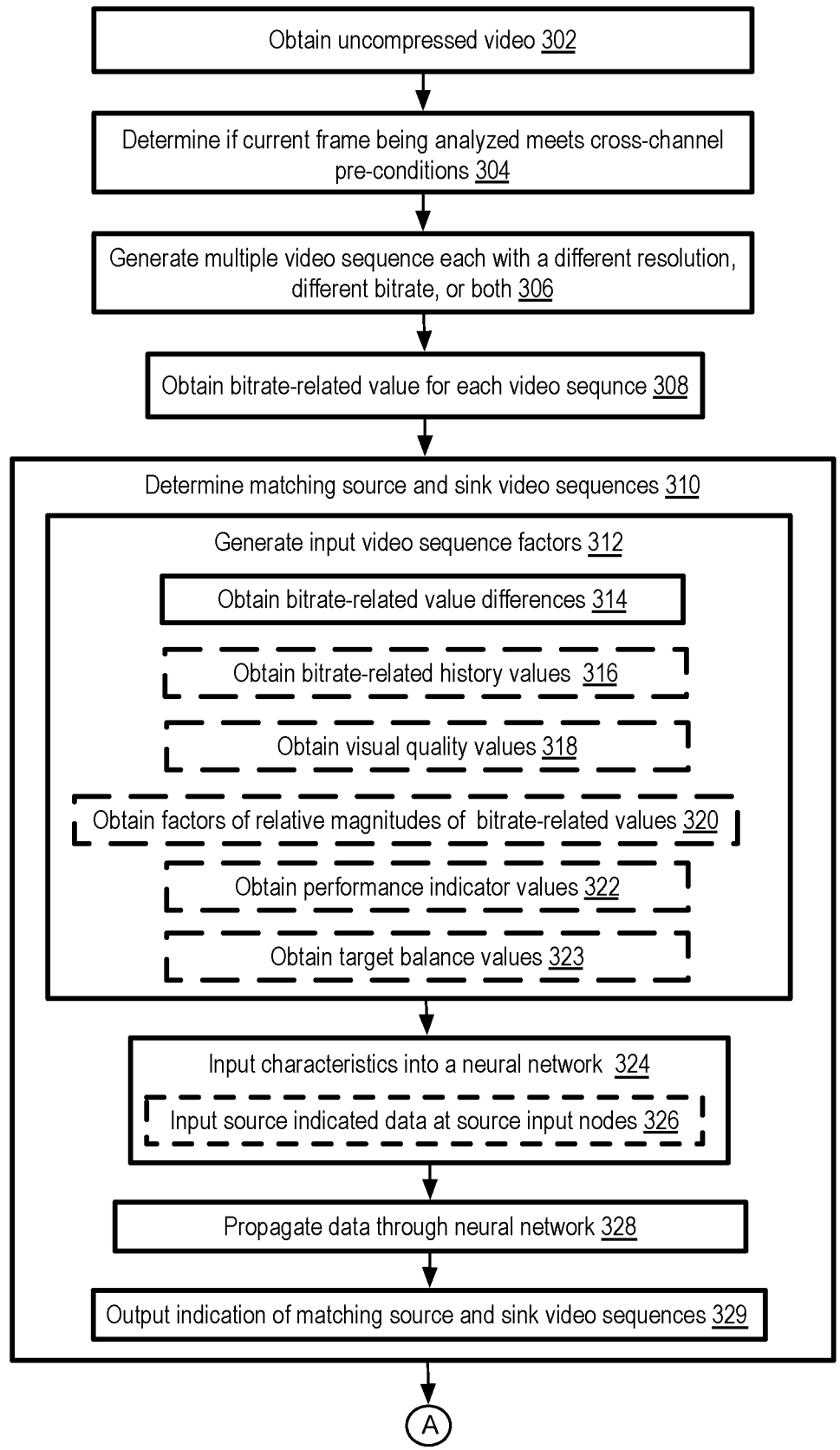
FIGS. 3A-3B is a detailed example method of video coding with neural network-based cross-channel referencing according to at least one of the implementations herein.
Figure 3B:
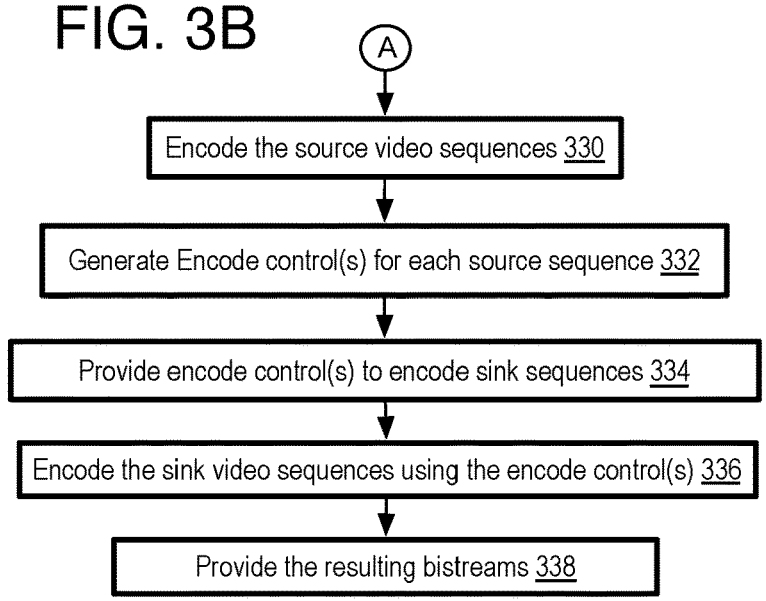
Figure 4:
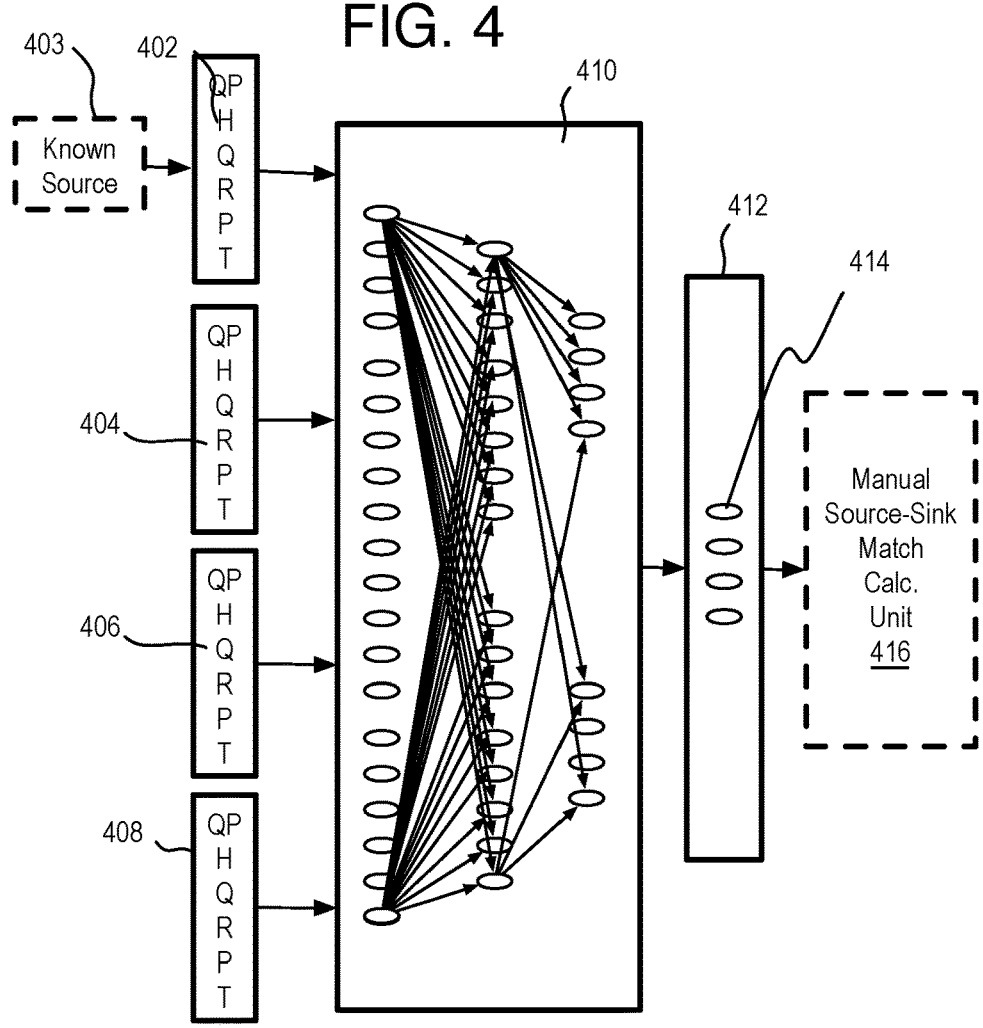
FIG. 4 is a schematic diagram of an example neural network unit used for performing cross-channel referencing according to at least one of the implementations herein.

Referring to FIGS. 3A-3B, an example process 300 for video coding is arranged in accordance with at least some implementations of the present disclosure. Process 300 may include one or more operations 302-338 generally numbered evenly. Process 300 may form at least part of a video coding process. By way of non-limiting example, process 300 may perform a coding process as performed by any device or system as discussed herein such as system 100 (FIG. 1) and/or video processor system or device 600 (FIG. 6), as well as a neural network source-sink matching system or device 400 (FIG. 4). Furthermore, process 300 may be described herein with reference to any of the systems 100, 400, and/or 600.

Process 300 may include "obtain an uncompressed video" 302, "determine if a current frame being analyzed meets cross-channel pre-conditions" 304, "generate multiple video sequences each with a different resolution, different bitrate, or both and the same frame of the video" 306, and "obtain bitrate-related value for each video sequence" 308. These operations are the same or similar here as in process 200 described above and need not be re-described here.

Process 300 may include "determine matching source and sink video sequences" 310, and this may first involve "generate input video sequence factors" 312, which are the video sequence characteristics described above. Thus, these factors, as with process 200 above, may include operations to "obtain bitrate-related value differences" 314, which may be the QP, Qstep as described above, or other values indicating a bitrate. In addition to obtaining the QP values of each video sequence, process 300 then may obtain values for each of the additional factors being considered. This may include any one or more of the following.

This may involve "obtain bitrate-related history values" 316 which provides QP (or other bitrate-related value) of certain previous frames, or a combination values such as an average of QPs of certain frames, whether the last 2, 5, 10, 50 and so forth, and may or may not have the current frame QP as a contributor to an average value. This could be a single QP or single QP value, or a number of QP values expected by the neural network described below.

Process 300 may include "obtain visual quality values" 318 which provide a value that represents the frame-type to be coded by the video sequence for matching with, or avoiding, other video sequences.

Another factor is to have process 300 "obtain factors of relative magnitudes of bitrate-related values" 320. Relativity, such as which QP is greater between the source and sink, would not have a value and could be an automatic factor considered by the neural network. However, an on/off bit could be set 0/1 and input so that the neural network knows if this is a consideration to attempt to restrict sources to have higher QPs than its sinks. This also could be a scale number in addition, or instead of, the on/off bit so that the priority of this factor can be considered where may be 5 is top priority and 1 is low priority for example, and whether this factor overrides another factor would depend on the priority rating.

Process 300 also may include "obtain performance indicator values" 322, and "obtain target balance values" 323 all as already described above with process 200 as well. Here, too, a single number may be provided to show how many extra or less source video sequences should be used relative to a number of source video sequences determined by strictly using the minimization rule.

Referring to FIG. 4, process 300 may continue to determine the matching by including "input characteristics into a neural network" 324. For this operation, a source-sink matching unit 400, similar to matching unit 120, may include video sequence input sets 402, 404, 406, and 408. Each input set includes one or more of the video sequence characteristics described above that can be input to a machine learning algorithm or neural network 410. For example, the bitrate-related value is shown on the input sets as QP, one or more historical QP values may be represented by the H, Q represents a quality value, R a relativity value, P a performance value, and T a target balance value, any of which may or may not be provided, and where some of these values may be more than one value for an individual input set 402, 404, 406, and/408 as explained above for the particular factor input, and as long as the neural network 410 has an input node expecting each one of the multiple values. Also, the input sets do not necessarily always need to have the same factors as each other. The input nodes of the neural network 410 shown at the input sets 402, 404, 407, and 408 may be structured to expect values of certain video sequences, certain factors, and a certain number of values for each of the factors whether or not these are the same from video sequence to video sequence.

Process 300 also optionally may include "input source indicated input data at source input nodes" 326. By one approach, preliminary operations may take place that determine source video sequences, and the neural network generates sink video sequences and matches, while either confirming the selection of source video sequences or modifying which video sequences are to be source video sequences. This may be accomplished by using the default or initial source sequences from first or initial frames of a global video sequence as described above, or process 200 without the neural network, and with or without the additional factors, may be used to set initial source video sequences for the neural network 410. In this case, source input nodes are fixed at set 402 for example, to receive data of a previously identified known source video sequence 403 for the current frame being analyzed.

By one form, all video sequences are input to a single neural network 410 as shown. In other alternatives, however, each resolution, bitrate, or other parameter could have its own neural network when mixing of neural networks across different resolutions or other parameters is not desired for example. Otherwise, separate neural networks could be provided for which performance options will be enabled or to predict the performance of all the frames.

Process 300 then may include "propagate data through neural network" 328. By one form, the source-sink matching unit may have a machine learning algorithm or neural network 410. The neural network 410 may be trained to output desired indicators of source sequences, sink sequences, and/or matches by using the factors described above. The training may be supervised, unsupervised, or some combination as determined by experimentation.

The structure of the neural network may include any layer types and numbers, weights, biases, activation functions, and so forth as determined by experimentation, and may include one or more convolutional layers, recurrent layers, and so forth whether fully connected layers, propagation in more than one channel, and so forth, necessary to provide the desired output. Such a neural network can be implemented by a combination of software and fixed-function hardware, such as on GPUs or ISPs with multiply-accumulate MAC circuits for example, but otherwise could be implemented by CPUs instead as described below with system 600.

Process 300 then may include "output indication of matching source and sink video sequences" 329, where neural network 410 may have an output layer 412, here shown with four outputs 414 for a small system with only four video sequences total. Many more video sequences could be handled as needed by the encoder. Each output or output node position represents a specific video sequence (such as with a specific resolution and/or target bitrate). By one form when the neural network outputs indications of matches, the neural network may have a binary output for each video sequence where a first binary value of a first digit provides a 0 for source or 1 for sink that indicates whether the video sequence is a source or sink video sequence. The remaining digits of the output node may either have each digit represent the other video sequences (where 0 is no match but 1 refers to a matched sink), or may have the value of the sink video sequence. Thus, for one example, if the output nodes are numbered one to four and video sequence one is a source video sequence with video sequence four as its sole sink video sequence, then the output number may be 0001 indicating source (first digit) and the next three digits represent video sequences 2, 3, and 4 respectively so that only the last digit for video sequence four indicates a sink video sequence for source video sequence one. By another example, the output reserved for video sequence one may be 0100 where the first digit indicates source or sink of video sequence one, and the next three digits 100 is four in binary indicating that video sequence four is a sink video sequence for source video sequence one. In this latter case, each video sequence could have an output node for each possible match so that multiple sinks for a single source could be indicated, where no match may be indicated as 0000. Many other variations are possible.

By other alternatives, the Neural network outputs probabilities and a manual source-sink match calculation unit 416 uses the probabilities to determine or compute the source and sink assignments, and/or the source-sink matches. For example, the output nodes may each represent a video sequence and the output value is a probability that the video sequence is a source video sequence. In some examples a sufficient amount of output nodes is provided for each possible pair match, and the probability indicates the likelihood of that particular pair. In these cases, a manual calculation unit may use the probabilities where over a certain threshold the video sequence is deemed to be a source or a matched pair. By other examples, the higher priority is minimizing the number of sources while still maintaining a minimum probability requirement for a source sink pairing. For example, a 90% source sink pair, while a very high probability, still might be skipped for a different source with an undesirably lower probability of 85% or 80%, which is still over a probability threshold for example, when the source can be a match for more sinks despite the lower probability.

The remaining operations are the same or similar as that of process 200. Thus process 300 may include "encode the source video sequences" 330, "generate encode control(s) for each source sequence" 332, "provide encode control(s) to encode sink sequences" 334, "encode the sink video sequences using the encode control(s)" 336, and "provide the resulting bitstreams" 338.

Referring to FIG. 5, an example process 500 for video coding is arranged in accordance with at least some implementations of the present disclosure. Process 500 may include one or more operations 502-506 numbered evenly. Process 500 may form at least part of a video coding process. By way of non-limiting example, process 500 may perform a coding process as performed by any device or system as discussed herein such as system 100 and/or video processor system or device 600. Furthermore, process 500 will be described herein with reference to system 600 of FIG. 6.

FIG. 6 is an illustrative diagram of an example system or device 600 for video coding, arranged in accordance with at least some implementations of the present disclosure. As shown in FIG. 6, system 600 may include a central processor 601, a video processor 602, and a memory 603. The video processor optionally may have a decoder 604 as well as a multiple sequence generation unit 605, a pre-processing unit 606, and a cross-channel control unit 608. The cross-channel control unit 608 may have a source-sink matching unit 610 and an encode control unit 612 similar to those units so named on system 100. The source-sink matching unit 610 may have an initial source determination unit 626, a matching unit 628, an encode control assignment unit 630, an optional sequence factor unit 632, an optional neural network unit 634, and an optional manual source-sink match calculation unit 636 to perform the source video sequence to sink video sequence matches or pairing. The video processor 602 also may have a BRC 614 (whether separate as shown here or in each encode unit, and separate encoder modules (or encode units) 616, 618, 620, 622, to 624 for N different encodes here shown as encodes at different resolutions 4K, 1080p, 720p, 480p, to N respectively.

In an implementation, memory 603 implements buffers 102 and 132 (FIG. 1). Furthermore, in the example of system 600, memory 603 may store video data or related content such as frame data, bitrate-related data including QPs, any other cross-channel referencing data including data to perform referencing operations including additional factor data mentioned above, neural network (NN) data, NN input and output data, and encode unit data such as coding unit data, motion vector data, intra mode decision data, coding unit partitioning data, transform unit split depth data, bitstream data, coding parameters, coding controls, and/or any other data as discussed herein.

As shown, in some implementations, cross-channel control unit 608, encode control unit 612, and simultaneous encode units 616, 618, 620, 622, to 624 are implemented via video processor 602. In other implementations, one or more or portions of these units are implemented via central processor 601 or another processing unit such as an image processor, a graphics processor, or the like.

Video processor 602 may include any number and type of video, image, or graphics processing units that may provide the operations as discussed herein. Such operations may be implemented via software or hardware or a combination thereof. For example, video processor 602 may include circuitry dedicated to manipulating frames, frame data, or the like obtained from memory 603, and may include software and/or hardware to operate the neural network unit 634. Central processor 601 may include any number and type of processing units or modules that may provide control and other high level functions for system 600 and/or provide any operations as discussed herein. Memory 603 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 603 may be implemented by cache memory.

In an implementation, one or more or portions of at least the cross-channel control unit 608, encode control unit 612, and simultaneous encode units 616, 618, 620, 622, to 624 are implemented via an execution unit (EU). The EU may include, for example, programmable logic or circuitry such as a logic core or cores that may provide a wide array of programmable logic functions. In an implementation, one or more or portions of cross-channel control unit 608, encode control unit 612, and simultaneous encode units 616, 618, 620, 622, to 624 are implemented via dedicated hardware such as fixed function circuitry or the like including MACs to operate the neural network for example. Fixed function circuitry may include dedicated logic or circuitry and may provide a set of fixed function entry points that may map to the dedicated logic for a fixed purpose or function.

Returning to process 500, process 500 may include "generating multiple video sequences of the same image content of a video wherein the individual video sequences each have a different resolution, different bitrate, or both, and a bitrate-related value" 502. Here, when the system is operating a transcoder, a decoder 604 may be provide non-compressed image data of a video. Otherwise, a camera or other device may provide non-compressed image data. Either way, the multiple sequence generation unit 605 may construct multiple video sequences, each with different resolutions and/or bitrates as mentioned above. Whether before or after such video sequence generation, a pre-processing unit 606 may modify the format of the video sequence to be compatible with encoding or a specific encode unit 616, 618, 620, 622, to 624.

Process 500 may include "determining whether the multiple video sequences comprise at least one source video sequence matched to at least one sink video sequence of the multiple video sequences depending at least on comparisons among the bitrate-related values" 504. By one form, an initial source video sequence may be determined by an initial source determination unit 626 and as a default setting for a first or early frames in a video sequence, but otherwise, which video sequences are sources, and which are sinks, is determined in the same general operation rather determining one before the other in series. The bitrate and resolution of the video sequences may be any suitable values. In an implementation, one video sequence has the resolution of 4K and bitrate of 20 Mbps. Otherwise, the video sequences may have parameters corresponding to the different encode units 616, 618, 620, 622, to 624. Each encode unit may handle multiple bitrates such as 1M, 2M, 4M, and 8M to name a few examples.

Thereafter, the matching unit 628 obtains bitrate-related values from the BRC 614 and from each video sequence, where the bitrate related values may be QPs by one option, and are compared to the QP of all of the other video sequences. Those QPs with differences that are less than a threshold, such as about 10 in one example when the QP range is 0 to 52, are considered a match. A minimization rule is applied to minimize the number of sources to reduce the computational load and time consumption of the system. This involves providing an individual source video sequence with as many sinks as possible to reduce the number of source video sequences and increase the number of sink video sequences.

While the matches could be determined on bitrate-related comparisons and the minimization rule alone, additional factors optionally may be used by the sequence factor unit 632 as well to determine whether video sequence is a source or a sink and should be matched to another video sequence. This includes the relative magnitude factor, the historical bitrate-related values factor, the quality factor, the performance factor, and the targeted balance factor all already mentioned and described in detail above. The sequence factor unit 632 may collect the data needed to apply these factors. By one form, such as in process 200, these factors mainly adjust the permissible numbers of source and sink video sequences up and down, and may be applied to a maintained permitted total of the number of source and sink video sequences as well as a listing of the matches.

By another form as described with process 300, any of these characteristics of the video sequences may be input to a neural network operated by the neural network unit 634 by one example. The neural network may output indicators of at least one of: which video sequences are source video sequences, which video sequences are sink video sequences, and which source and sink video sequences form a match. The input to the neural network may include multiple characterizations of each video sequence being considered to be matched and including at least the bitrate-related value. The additional factors may be represented in the input for individual video sequences as explained above, and by one option, at least one or more of the input nodes to the neural network may be reserved for data of one or more video sequences previously determined to be source video sequences.

As to the output of the neural network, by one approach, the output layer of the neural network provides indication of the source-sink matches itself. In this case, the neural network may have each or individual output node represent a specific one of the video sequences, and outputs a binary value with one 0 or 1 digit to indicate source or sink video sequence, and the remaining digits of the output to indicate a matching video sequence. The details are provided above.

By another alternative, the neural network has each output node in an output layer represent a match between two specific video sequences, and the neural network outputs a probability of a match between those video sequences. The manual source-sink match calc. unit 636 then uses the probabilities to determine if the match should be used such as by comparing the probabilities to a threshold, or for other such operations as described above.

Then, process 500 may include "encoding the at least one sink video sequence using at least one encode control that restricts encode decisions to encode the sink video sequence depending on encode decisions previously established for a matching source video sequence" 506. So, once the source-sink matches are determined, the source video sequences are encoded, and the encode control unit 612 obtains their coding parameters and translates them into encoding controls that are then provided to the encode unit 616 to 624 for encoding the sink video sequences by using the encode controls. This reduces the number of alternatives for encode decisions as described above, thereby increasing performance without a noticeable effect to quality for some examples.

The sink video sequence is encoded at the second resolution or the second bitrate using the encode controls to generate a second bitstream, wherein the second bitstream is independent of the first bitstream. As discussed, the first and second bitstreams are independent in that the first and second bitstreams do not rely in any way on each other for decode of the video (e.g., the actual operations performing the decoding rather than cross-referencing data to obtain encoder settings).

Process 500 may be repeated any number of times either in series or in parallel for any number of videos, pieces of video content, video segments, or the like. As discussed, process 500 may provide for video cluster encoding one piece of video content to generate multiple independent bitstreams that represent encodes of differing characteristics such as frame resolutions, bitrates, frame rates, and combinations thereof.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 7:
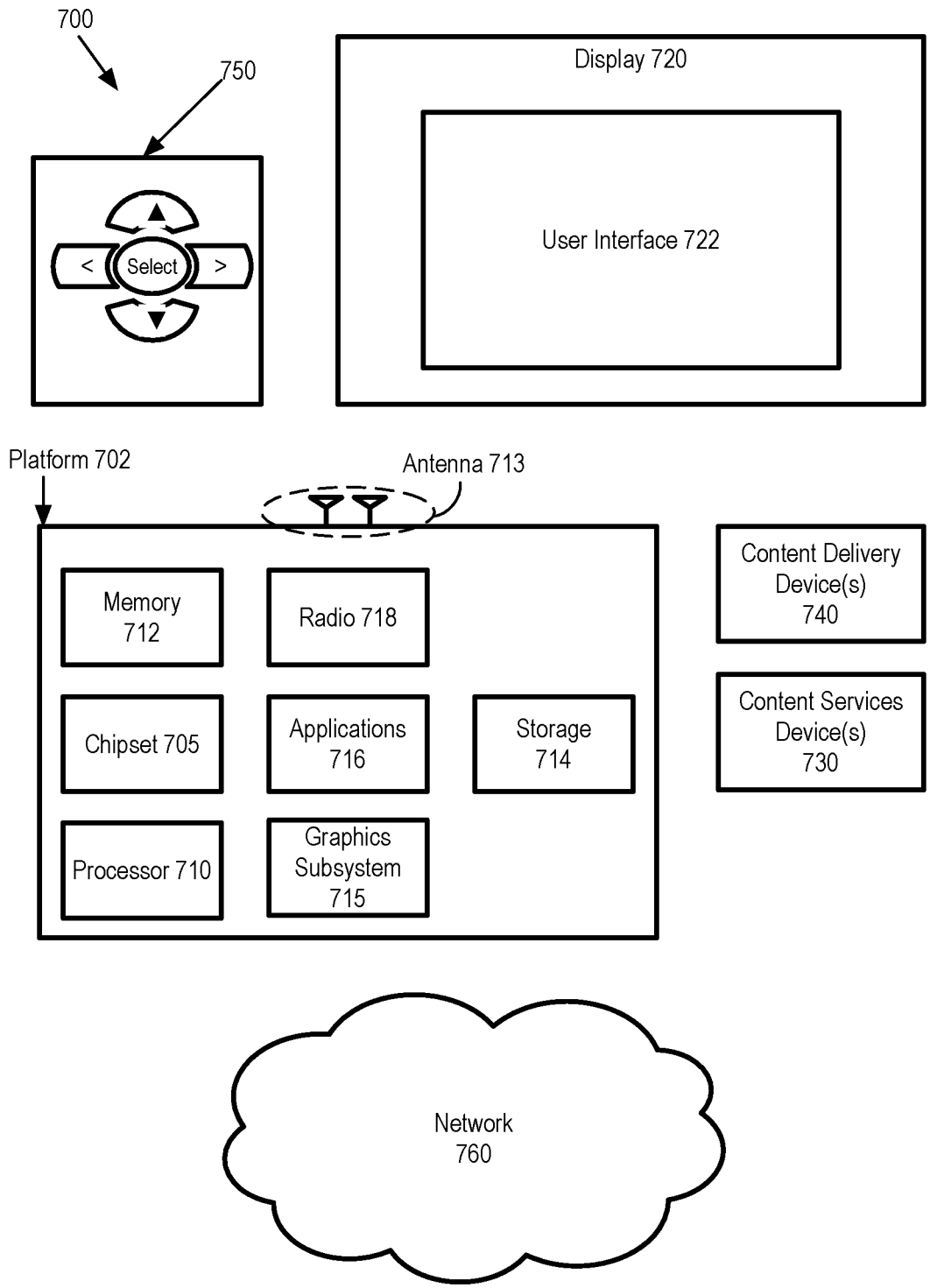
FIG. 7 is an illustrative diagram of an example system.

FIG. 7 is an illustrative diagram of an example system 700, arranged in accordance with at least some implementations of the present disclosure. In various implementations, system 700 may be a mobile system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, antenna 713, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone device communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of uni-directionally or bi-directionally communicating content between content providers and platform 702 and/display 720, via network 760 or directly. It will be appreciated that the content may be communicated uni-directionally and/or bi-directionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of may be used to interact with user interface 722, for example. In various implementations, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 720) by movements of a pointer, cursor, focus ring, or other visual indicators displayed on the display. For example, under the control of software applications 716, the navigation features located on navigation may be mapped to virtual navigation features displayed on user interface 722, for example. In various implementations, may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In various implementations, the graphics driver may include a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various implementations, platform 702 and display 720 may be an integrated unit. Display 720 and content service device(s) 730 may be integrated, or display 720 and content delivery device(s) 740 may be integrated, for example. These examples are not meant to limit the present disclosure.

In various implementations, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 7.

Figure 8:
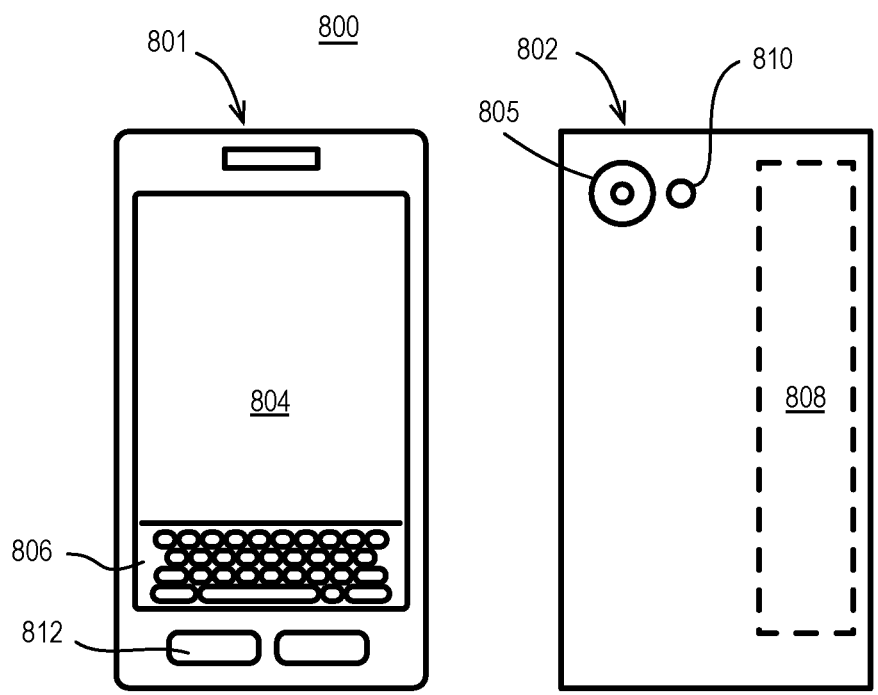
FIG. 8 illustrates an example device, all arranged in accordance with at least some implementations of the present disclosure.

As described above, system 700 may be embodied in varying physical styles or form factors. FIG. 8 illustrates an example small form factor device 800, arranged in accordance with at least some implementations of the present disclosure. In some examples, system 700 may be implemented via device 800. In other examples, system 100 or portions thereof may be implemented via device 800. In various implementations, for example, device 800 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 8, device 800 may include a housing with a front 801 and a back 802. Device 800 includes a display 804, an input/output (I/O) device 806, and an integrated antenna 808. Device 800 also may include navigation features 812. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. As shown, device 800 may include a camera 805 (e.g., including a lens, an aperture, and an imaging sensor) and a flash 810 integrated into back 802 (or elsewhere) of device 800. In other examples, camera 805 and flash 810 may be integrated into front 801 of device 800 or both front and back cameras may be provided. Camera 805 and flash 810 may be components of a camera module to originate image data processed into streaming video that is output to display 804 and/or communicated remotely from device 800 via antenna 808 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first implementations, a device for video coding comprises memory to store at least one video; and at least one processor communicatively coupled to the memory and being arranged to operate by: generating multiple video sequences of the same image content of a video wherein the individual video sequences each have a different resolution, different bitrate, or both, and a bitrate-related value; determining whether the multiple video sequences comprise at least one source video sequence matched to at least one sink video sequence of the multiple video sequences depending at least on comparisons among the bitrate-related values; and encoding the at least one sink video sequence using at least one encode control that restricts encode decisions to encode the sink video sequence depending on encode decisions previously established for a matching source video sequence.

In one or more second implementations, further to the first implementations, wherein the bitrate-related value is a quantization parameter (QP) or a quantization step value.

In one or more third implementations, further to the first or second implementations, wherein the at least one processor being arranged to operate by determining whether each possible pair of video sequences is a match without being limited to resolution or bitrate of the video sequences to make the matches.

In one or more fourth implementations, further to the first through third implementations, wherein the at least one processor being arranged to operate by determining a source video sequence matches a sink video sequence at least when the difference between the bitrate-related values of two of the video sequences is below a threshold.

In one or more fifth implementations, further to the first through fourth implementations, wherein the at least one processor being arranged to operate by determining a source video sequence matches a sink video sequence at least when the difference between the bitrate-related values of two of the video sequences is below a threshold.

In one or more sixth implementations, wherein at least one video sequence is not matched to any other video sequence while at least one other video sequence is matched to another video sequence.

In one or more seventh implementations, further to the first through sixth implementations, wherein a bitrate-related value of a video sequence closest to a mean, median, or mode of the bitrate-related values is selected as a source video sequence to multiple other sink video sequences.

In one or more eighth implementations, further to the first through seventh implementations, wherein the matches of source and sink video sequences change from frame to frame so that only video sequences on the same frame are matched, wherein a video sequence comprises pixel image data of a frame.

In one or more ninth implementations, further to the first through eighth implementations, wherein the at least one processor being arranged to operate by determining a source video sequence is matched to a sink video sequence depending on at least one of: whether a video sequence has a bitrate-related value that is larger or smaller than the bitrate-related value of another video sequence, historical bitrate-related values of video sequences on at least one prior frame relative to the same video sequences being analyzed on a current frame, a performance-related value that indicates image content complexity and depends on actual versus target frame encoding speeds, a quality-related value that depends on a type of frame within an encoding group of picture (GOP) frame-type hierarchy, and a target quality-performance balance value that considers a scale of target balances from (1) fastest and least accurate to (2) slowest and most accurate.

In one or more tenth implementations, further to the first through ninth implementations, wherein the at least one processor being arranged to operate by a neural network arranged to receive characteristics of each video sequence including at least the bitrate-related value to determine at least one of: which video sequences are source video sequences, which video sequences are sink video sequences, and which source video sequences and sink video sequences form a match.

By one or more eleventh implementations, a method for video coding comprises generating multiple video sequences of the same image content of a video wherein the individual video sequences each have a different resolution, different bitrate, or both, and a bitrate-related value; determining whether the multiple video sequences comprise at least one source video sequence matched to at least one sink video sequence of the multiple video sequences depending at least on comparisons among the bitrate-related values; and encoding the at least one sink video sequence using at least one encode control that restricts encode decisions to encode the sink video sequence depending on encode decisions previously established for a matching source video sequence.

By one or more twelfth implementations, and further to the eleventh implementations, wherein the bitrate-based value is a quantization parameter or quantization step value.

By one or more thirteenth implementations, and further to the eleventh or twelfth implementations, the method comprises minimizing the number of source video sequences comprising providing at least one source video sequence with multiple matched sink video sequences when one of the video sequences has a bitrate-related value within a threshold of the bitrate-related values of multiple other video sequences.

By one or more fourteenth implementations, and further to any one of the eleventh to thirteenth implementations, the method comprises determining a source video sequence is matched to a sink video sequence depending on the relative magnitude of the bitrate-related values so that a match is found depending on whether the bitrate-related value of at least one of the video sequences is larger than the bitrate-related value of at least one other of the video sequences.

By one or more fifteenth implementations, and further to the eleventh or fourteenth implementations, wherein the video sequences and bitrate-related values are of a current frame being analyzed, and the method comprising determining a source video sequence is matched to a sink video sequence depending on bitrate-related values of prior frames and of the same video sequences extending from the prior frames and onto a current frame being analyzed.

By one or more sixteenth implementations, and further to any of the eleventh to fifteenth implementations, wherein the method comprises determining a source video sequence is matched to a sink video sequence depending on a quality-related value that depends on a type of frame within an encoding group of pictures (GOP) frame-type hierarchy.

By one or more seventeenth implementations, and further to any of the eleventh to sixteenth implementations, wherein the method comprises determining a source video sequence is matched to a sink video sequence depending at least in part on a performance-related value that indicates image content complexity and depends on actual versus target frame encoding rates.

By one or more eighteenth implementations, and further to any of the eleventh to seventeenth implementation, wherein the method comprises determining a source video sequence is matched to a sink video sequence further depending on a target scale value that indicates a target quality-performance balance value that considers a scale of target balances from (1) fastest and least accurate to (2) slowest and most accurate.

By one or more nineteenth implementations, at least one non-transitory computer-readable medium has stored instructions thereon that when executed cause a computing device to operate by generating multiple video sequences of the same image content of a video wherein the individual video sequences each have a different resolution, different bitrate, or both, and a bitrate-related value; determining whether the multiple video sequences comprise at least one source video sequence matched to at least one sink video sequence of the multiple video sequences depending at least on comparisons among the bitrate-related values; and encoding the at least one sink video sequence using at least one encode control that restricts encode decisions to encode the sink video sequence depending on encode decisions previously established for a matching source video sequence.

By one or more twentieth implementations, and further to the nineteenth implementations, wherein the instructions cause the computing device to operate by determining the matches comprising using a neural network that receives video sequence characterizations as input and outputs indicators of at least one of: which video sequences are source video sequences, which video sequences are sink video sequences, and which source and sink video sequences form a match.

By one or more twenty-first implementations, and further to the nineteenth or twentieth implementations, wherein the input to the neural network comprises multiple characterizations of each video sequence being considered to be matched and including at least the bitrate-related value.

By one or more twenty-second implementations, and further to any of the nineteenth to twenty-first implementations, wherein at least one or more of input nodes to the neural network are reserved for data of one or more video sequences previously determined to be source video sequences.

By one or more twenty-third implementations, and further to any one of the nineteenth to twenty-second implementations, wherein the neural network has an output that represents a specific one of the video sequences, and outputs a binary value with one 0 or 1 digit to indicate source or sink video sequence, and the remaining digits of the output to indicate a matching video sequence.

By one or more twenty-fourth implementations, and further to any of the nineteenth to twenty-second implementations, wherein the neural network has each output node in an output layer represent a match between two specific video sequences, and the neural network outputs a probability of a match between those video sequences; the method comprising determining the source-sink matches by using the probabilities.

By one or more twenty-fifth implementations, and further to any of the nineteenth to twenty-fourth implementations, wherein the encode controls comprise at least one of a restriction to check only inter modes and eliminate checks of intra modes, a restriction to check only intra modes and eliminate checks of inter modes, a restriction to check only a limited size of coding units, and a restriction to check only a limited size of transform units.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. A device for video coding comprising:
   memory to store at least one video; and
   at least one processor communicatively coupled to the memory and being arranged to operate by:
   generating multiple video sequences of the same image content of a video wherein the individual video sequences each have a different resolution, different bitrate, or both, and a bitrate-related value;

determining whether the multiple video sequences comprise at least one source video sequence matched to at least one sink video sequence of the multiple video sequences depending at least on comparisons among the bitrate-related values; and encoding the at least one sink video sequence using at least one encode control that restricts encode decisions to encode the sink video sequence depending on encode decisions previously established for a matching source video sequence, wherein the at least one processor being arranged to operate by determining whether each possible pair of video sequences being considered is a match without being limited to resolution of the video sequences to make the matches.

2. The device of claim 1, wherein the bitrate-related value is a quantization parameter (QP) or a quantization step value.

3. The device of claim 1, wherein the at least one processor being arranged to operate by determining a source video sequence matches a sink video sequence at least when the difference between the bitrate-related values of two of the video sequences is below a threshold.

4. The device of claim 1, wherein at least one source video sequence is matched to multiple sink video sequences.

5. The device of claim 1, wherein at least one video sequence is not matched to any other video sequence while at least one other video sequence is matched to another video sequence.

6. The device of claim 1, wherein a bitrate-related value of a video sequence closest to a mean, median, or mode of the bitrate-related values is selected as a source video sequence to multiple other sink video sequences.

7. The device of claim 1, wherein the matches of source and sink video sequences change from frame to frame so that only video sequences on the same frame are matched, wherein a video sequence comprises pixel image data of a frame.

8. The device of claim 1, wherein the at least one processor being arranged to operate by determining a source video sequence is matched to a sink video sequence depending on at least one of:

whether a video sequence has a bitrate-related value that is larger or smaller than the bitrate-related value of another video sequence, historical bitrate-related values of video sequences on at least one prior frame relative to the same video sequences being analyzed on a current frame, a performance-related value that indicates image content complexity and depends on actual versus target frame encoding speeds, a quality-related value that depends on a type of frame within an encoding group of picture (GOP) frame-type hierarchy, and a target quality-performance balance value that considers a scale of target balances from (1) fastest and least accurate to (2) slowest and most accurate.

9. The device of claim 1, wherein the at least one processor being arranged to operate by a neural network arranged to receive characteristics of each video sequence including at least the bitrate-related value to determine at least one of: which video sequences are source video sequences, which video sequences are sink video sequences, and which source video sequences and sink video sequences form a match.

10. A method for video coding comprising:

generating multiple video sequences of the same image content of a video wherein the individual video sequences each have a different resolution, different bitrate, or both, and a bitrate-related value;

determining whether the multiple video sequences comprise at least one source video sequence matched to at least one sink video sequence of the multiple video sequences depending at least on comparisons among the bitrate-related values, and comprising determining whether each possible pair of video sequences being considered is a match without being limited to resolution of the video sequences to make the matches; and encoding the at least one sink video sequence using at least one encode control that restricts encode decisions to encode the sink video sequence depending on encode decisions previously established for a matching source video sequence.

11. The method of claim 10, wherein the bitrate-related value is a quantization parameter or quantization step value.

12. The method of claim 10, comprising minimizing a number of source video sequences comprising providing at least one source video sequence with multiple matched sink video sequences when one of the video sequences has a bitrate-related value within a threshold of the bitrate-related values of multiple other video sequences.

13. The method of claim 10, comprising determining a source video sequence is matched to a sink video sequence depending on a relative magnitude of the bitrate-related values so that a match is found depending on whether the bitrate-related value of at least one of the video sequences is larger than the bitrate-related value of at least one other of the video sequences.

14. The method of claim 10, wherein the video sequences and bitrate-related values are of a current frame being analyzed, and the method comprising determining a source video sequence is matched to a sink video sequence depending on bitrate-related values of prior frames and of the same video sequences extending from the prior frames and onto a current frame being analyzed.

15. The method of claim 10, comprising determining a source video sequence is matched to a sink video sequence depending on a quality-related value that depends on a type of frame within an encoding group of pictures (GOP) frame-type hierarchy.

16. The method of claim 10, comprising determining a source video sequence is matched to a sink video sequence depending at least in part on a performance-related value that indicates image content complexity and depends on actual versus target frame encoding rates.

17. The method of claim 10, comprising determining a source video sequence is matched to a sink video sequence further depending on a target scale value that indicates a target quality-performance balance value that considers a scale of target balances from (1) fastest and least accurate to (2) slowest and most accurate.

18. At least one non-transitory machine readable medium comprising a plurality of instructions that, in response to being executed on a computing device, cause the computing device to code video by:

generating multiple video sequences of the same image content of a video wherein the individual video sequences each have a different resolution, different bitrate, or both, and a bitrate-related value;

determining whether the multiple video sequences comprise at least one source video sequence matched to at least one sink video sequence of the multiple video sequences depending at least on comparisons among the bitrate-related values and by using a neural network; and encoding the at least one sink video sequence using at least one encode control that restricts encode decisions to encode the sink video sequence depending on encode decisions previously established for a matching source video sequence.

19. The machine readable medium of claim 18, wherein the instructions cause the computing device to operate by determining the matches comprising using the neural network to receive video sequence characterizations as input and outputs indicators of at least one of: which video sequences are source video sequences, which video sequences are sink video sequences, and which source and sink video sequences form a match.

20. The machine readable medium of claim 18, wherein input to the neural network comprises multiple characterizations of each video sequence being considered to be matched and including at least the bitrate-related value.

21. The machine readable medium of claim 18, wherein at least one or more of input nodes to the neural network are reserved for data of one or more video sequences previously determined to be source video sequences.

22. The machine readable medium of claim 18, wherein the neural network has an output that represents a specific one of the video sequences, and outputs a binary value with one 0 or 1 digit to indicate source or sink video sequence, and the remaining digits of the output to indicate a matching video sequence.

23. The machine readable medium of claim 18, wherein the neural network has each output node in an output layer represent a match between two specific video sequences, and the neural network outputs a probability of a match between those video sequences; and wherein the instructions cause the computing device to operate by determining source-sink matches by using the probabilities.

24. The machine readable medium of claim 18, wherein the encode controls comprise at least one of a restriction to check only inter modes and eliminate checks of intra modes, a restriction to check only intra modes and eliminate checks of inter modes, a restriction to check only a limited size of coding units, and a restriction to check only a limited size of transform units.

* * * * *